United States Patent
Nicoara et al.

(10) Patent No.: US 11,532,148 B2
(45) Date of Patent: Dec. 20, 2022

(54) IMAGE PROCESSING SYSTEM

(71) Applicant: FotoNation Limited, Galway (IE)

(72) Inventors: Nicolae Nicoara, Brasov (RO);
Cristina Raceala, Brasov (RO);
Corneliu Zaharia, Brasov (RO);
Szabolcs Fulop, Brasov (RO); Oana Iovita, Brasov (RO)

(73) Assignee: FotoNation Limited, Galway (IE)

( * ) Notice: Subject to any disclaimer, the term of this patent is extended or adjusted under 35 U.S.C. 154(b) by 238 days.

(21) Appl. No.: 16/995,451

(22) Filed: Aug. 17, 2020

(65) Prior Publication Data

US 2020/0380291 A1 Dec. 3, 2020

Related U.S. Application Data

(63) Continuation of application No. 16/660,559, filed on Oct. 22, 2019, now abandoned, which is a
(Continued)

(30) Foreign Application Priority Data

Oct. 12, 2016 (WO) ................. PCT/EP2016/074519

(51) Int. Cl.
*G06V 10/75* (2022.01)
*G06K 9/62* (2022.01)
(Continued)

(52) U.S. Cl.
CPC ......... *G06V 10/751* (2022.01); *G06K 9/6257* (2013.01); *G06V 10/955* (2022.01); *G06V 40/161* (2022.01)

(58) Field of Classification Search
CPC .. G06V 10/751; G06V 10/955; G06V 40/161; G06V 10/7747; G06K 9/6257
(Continued)

(56) References Cited

U.S. PATENT DOCUMENTS

| 7,590,267 B2 | 9/2009 | Xiao et al. |
| 2004/0170318 A1 | 9/2004 | Crandall et al. |

(Continued)

FOREIGN PATENT DOCUMENTS

| CN | 101099675 | 1/2008 | |
| CN | 101127079 B | * 6/2010 | ......... G06K 9/00228 |

(Continued)

OTHER PUBLICATIONS

Office Action for U.S. Appl. No. 16/660,559, dated Nov. 25, 2019, Nicoara, "Image Processing System", 8 pages.
(Continued)

*Primary Examiner* — Amandeep Saini
(74) *Attorney, Agent, or Firm* — Lerner, David, Littenberg, Krumholz & Mentlik, LLP

(57) ABSTRACT

An image processing system comprises a template matching engine (TME). The TME reads an image from the memory; and as each pixel of the image is being read, calculates a respective feature value of a plurality of feature maps as a function of the pixel value. A pre-filter is responsive to a current pixel location comprising a node within a limited detector cascade to be applied to a window within the image to: compare a feature value from a selected one of the plurality of feature maps corresponding to the pixel location to a threshold value; and responsive to pixels for all nodes within a limited detector cascade to be applied to the window having been read, determine a score for the window. A classifier, responsive to the pre-filter indicating that a score for a window is below a window threshold, does not apply a longer detector cascade to the window before indicating that the window does not comprise an object to be detected.

20 Claims, 9 Drawing Sheets

Related U.S. Application Data continuation of application No. 15/380,906, filed on Dec. 15, 2016, now Pat. No. 10,460,198.

(60) Provisional application No. 62/387,247, filed on Dec. 23, 2015.

(51) Int. Cl.
*G06V 10/94* (2022.01)
*G06V 40/16* (2022.01)

(58) Field of Classification Search
USPC .......................................................... 382/118
See application file for complete search history.

(56) References Cited

U.S. PATENT DOCUMENTS

| | | |
|---|---|---|
| 2009/0018985 A1 | 1/2009 | Zhang et al. |
| 2011/0058741 A1 | 3/2011 | Ito et al. |
| 2012/0069003 A1 | 3/2012 | Birkbeck et al. |
| 2013/0279745 A1 | 10/2013 | Mitsui et al. |
| 2013/0287251 A1 | 10/2013 | Mitsui et al. |
| 2014/0133758 A1 | 5/2014 | Kienzle |
| 2016/0171344 A1 | 6/2016 | Chen et al. |
| 2017/0286780 A1 | 10/2017 | Zhang et al. |
| 2020/0050885 A1 | 2/2020 | Nicoara et al. |

FOREIGN PATENT DOCUMENTS

| | | | |
|---|---|---|---|
| CN | 101743537 | 6/2010 | |
| CN | 101794392 | 8/2010 | |
| CN | 104200236 | 12/2014 | |
| CN | 104715023 | 6/2015 | |
| EP | 2052347 B1 | 4/2011 | |
| EP | 3213257 B1 | 8/2018 | |
| JP | 2011059819 | 3/2011 | |
| JP | 4948379 B2 * | 6/2012 | ......... G06K 9/00973 |
| WO | 2008-107112 A2 | 9/2008 | |
| WO | 2016-083002 A1 | 6/2016 | |
| WO | 2017-108222 A1 | 6/2017 | |

OTHER PUBLICATIONS

Georgescu, et al. U.S. Appl. No. 62/210,243 entitled "Image Processing Apparatus" filed Aug. 26, 2015, 23 pages.
Munteanu, et al, U.S. Appl. No. 62/235,065 entitled "Method and system for tracking an object" filed Sep. 30, 2015, 23 pages.
Yee, Stephanie, and Chu, Tony; http://www.r2d3.us, "A Visual Introduction to Machine Learning", 44 pages.
European Communication pursuant to Article 94(3) EPC for European Application No. 16782208.9, dated Oct. 27, 2017, 5 pages.
CN Office Action for corresponding CN Patent Application No. 201680075939.1 dated May 21, 2021, 3 pages.
Viola, Paul et al., "Rapid Object Detection using a Boosted Cascade of Simple Features", Proceedings of the IEEE Computer Socity Conference on Computer Vision and Pattern Recognition 2001, 9 pages.
Wen, Jia-Bao "A novel two-stage weak classifier selection approach for adaptive boosting for cascade face detector", Neurocomputing 116, 2012, 14 pages.

* cited by examiner

IMAGE PROCESSING SYSTEM

CROSS REFERENCE TO RELATED APPLICATIONS

This application is a continuation of U.S. patent application Ser. No. 16/660,559 filed Oct. 22, 2019 which is a continuation of Ser. No. 15/380,906 filed Dec. 15, 2016, issued as U.S. Pat. No. 10,460,198 on Oct. 29, 2019 which claims the benefit of U.S. Provisional Patent Application No. 62/387,247 filed on Dec. 23, 2015, the contents of which are expressly incorporated by reference herein in their entirety.

FIELD

The present invention relates to an image processing system.

BACKGROUND

Feature detection within images and streams of images is becoming an increasingly important function in image acquisition and processing devices.

Face detection and tracking, for example, as described in European Patent No. EP2052347 (Ref: FN-143) is a well-known example of feature detection in image processing. These techniques enable one or more face regions within a scene being imaged to be readily delineated and to allow for subsequent image processing based on this information. Such subsequent image processing can include face recognition which attempts to identify individuals being imaged, for example, for tagging or authentication purposes; auto-focusing by bringing a detected and/or selected face region into focus; or defect detection and/or correction of the face region(s).

Referring now to FIG. 1, there is shown a block diagram for a conventional type template matching engine (TME) 10 for identifying features within an image or portion of an image. The processing steps of the TME are:

1. A detector cascade is loaded into a detectors buffer 12 from system memory (not shown) across a system bus. A detector cascade comprises information for a sequence of stages which are applied to a window within an image to determine if the window contains an object to be detected. The detector cascade, use of which is explained in more detail below, can be arranged to be applied by a classifier 22 to one or more different forms of features extracted from an image. As well as the image intensity (Y) value itself, examples of features which can be employed by a detector cascade include: Integral Image or $II^2$ image typically employed by a HAAR classifier, Histogram of Gradients (HoG), Census or Linear Binary Patterns (LBP). Details of methods for producing HoG maps are disclosed in PCT Application No. PCT/EP2015/073058 (Ref: FN-398) and U.S. Application No. 62/235,065 filed 30 Sep. 2015 (Ref: FN-0471) and techniques for providing multiple feature maps for a region of interest within an image are disclosed in U.S. Patent Application No. 62/210,243 filed 26 Aug. 2015 (Ref: FN-469);
2. Intensity plane information, for example, a luminance channel, for the input image or image portion is loaded into a Y cache 14 from the system memory across the system bus. (Other image planes could also be used if required.);
3. The image in the Y cache is scanned with a sliding window on various scales, one scale at a time as follows:
    a. A resampler module 16 resampler the input image to the desired scale (usually processing begins with the most downsampled version of an image to detect the largest features).
    b. The window size employed after the resampler 16 is typically fixed and, depending on the application and implementation, may be 22×22, 32×32 or 32×64 pixels. (Thus the size of object being detected within a given image depends on the degree of downsampling of the image prior to application of a detector cascade.)
    c. The sliding window step between adjacent windows is typically 1 or 2 pixels.
4. For each pixel location of the sliding window, the values for the corresponding locations of the feature maps (channels), such as those referred to above, are calculated by a feature calculator 18. Note that the feature calculator can take into account the fact that consecutive windows overlap so it does not re-calculate feature map values that have already calculated for an image.
5. The feature map values from the feature calculator 18 can be buffered in a features buffer 20.
6. The classifier 22 applies the detector cascade from the detectors buffer 12 to the feature maps for the current window in the features buffer 20 to determine if the window features match or not an object of interest (e.g. a face). Within the classifier 22, a detector cascade is typically applied stage-by-stage, building a score for a window. A complete detector cascade can have any number stages, for example, up to 4096 stages is a common maximum length. (Note that most windows fail after a few detector stages. For example, with a well-trained classifier, 95% of the windows tested fail after 12 stages.)
7. Steps 2 to 6 of the above process can then be repeated from scratch for the next window in the image.

As disclosed in PCT Application No. PCT/EP2015/073058 (Ref: FN-398), it is possible for the feature calculation module 18 to provide the required features buffer 20 for a new window at each clock cycle. The classifier 22 typically processes one detector cascade stage per clock cycle and typically, this happens only after the processing pipeline is filled at the start of each new window—this can again involve a number of clock cycles.

Thus, it will be seen that while processing one window, the classifier 22 needs to stall the whole pipeline before it (using a backpressure mechanism indicated by the upwards arrows connecting elements 22-14). Thus, the classifier 22 is the bottleneck of the process, due to the fact that the detector cascade stages must be applied in a sequence.

SUMMARY

According to the present invention there is provided a system for processing images as claimed in claim 1.

In embodiments, a Prefilter module is added to a template matching engine (TME) in order to improve performance by accelerating processing. The Prefilter has the following role and features:

1. The Prefilter applies a limited number of stages of a detector as an image is being read with a view to rejecting a high proportion of windows with as few stages as possible. In one embodiment, the Prefilter comprises enough stages to reject 95% of windows from needing to be analysed subsequently within a full detector cascade.

2. The Prefilter can process one window per clock cycle, meaning that it can process windows without causing backpressure in an image processing pipeline.

3. Only if the first limited number of stages of the Prefilter indicate that a window should not be rejected, will the Prefilter indicate to the classifier that it should apply a full detector cascade.

Using for example, a 12 stage Prefilter, the TME can be accelerated of the order of up to 20 times because the Prefilter can process one window per clock cycle, while an exemplary classifier would need 20 clock cycles to apply the same first 12 stages of the detector (8 cycle pipeline latency+ 12 cycles for the 12 stages).

In a second aspect, there is provided an image processing system as claimed in claim 12.

According to this aspect a classifier is trained to base each decision on separate feature maps so that features can be read in a single clock cycle and each stage can be executed in a single clock cycle.

In a third aspect, there is provide an image processing system as claimed in claim 18.

In this aspect, a programmable controller allows a plurality of reduced stage detectors to be run on a window before deciding on their progress and then determining which, if any, longer stage detectors should be applied to the windows.

BRIEF DESCRIPTION OF THE DRAWINGS

Various embodiments of the invention will now be described, by way of example, with reference to the accompanying drawings, in which.

DETAILED DESCRIPTION

Figure 1:
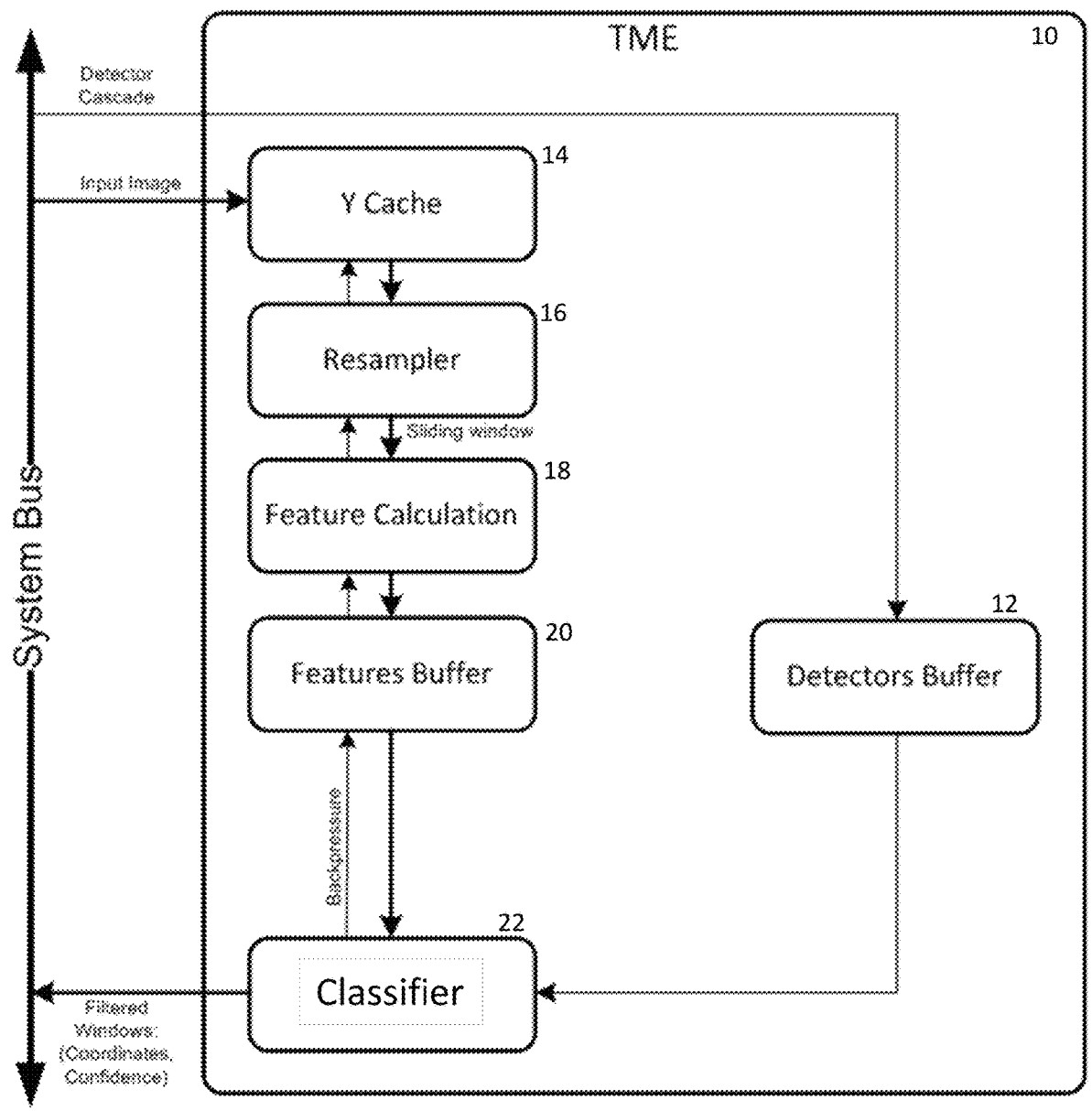
FIG. 1 shows a conventional TME module.
Figure 2:
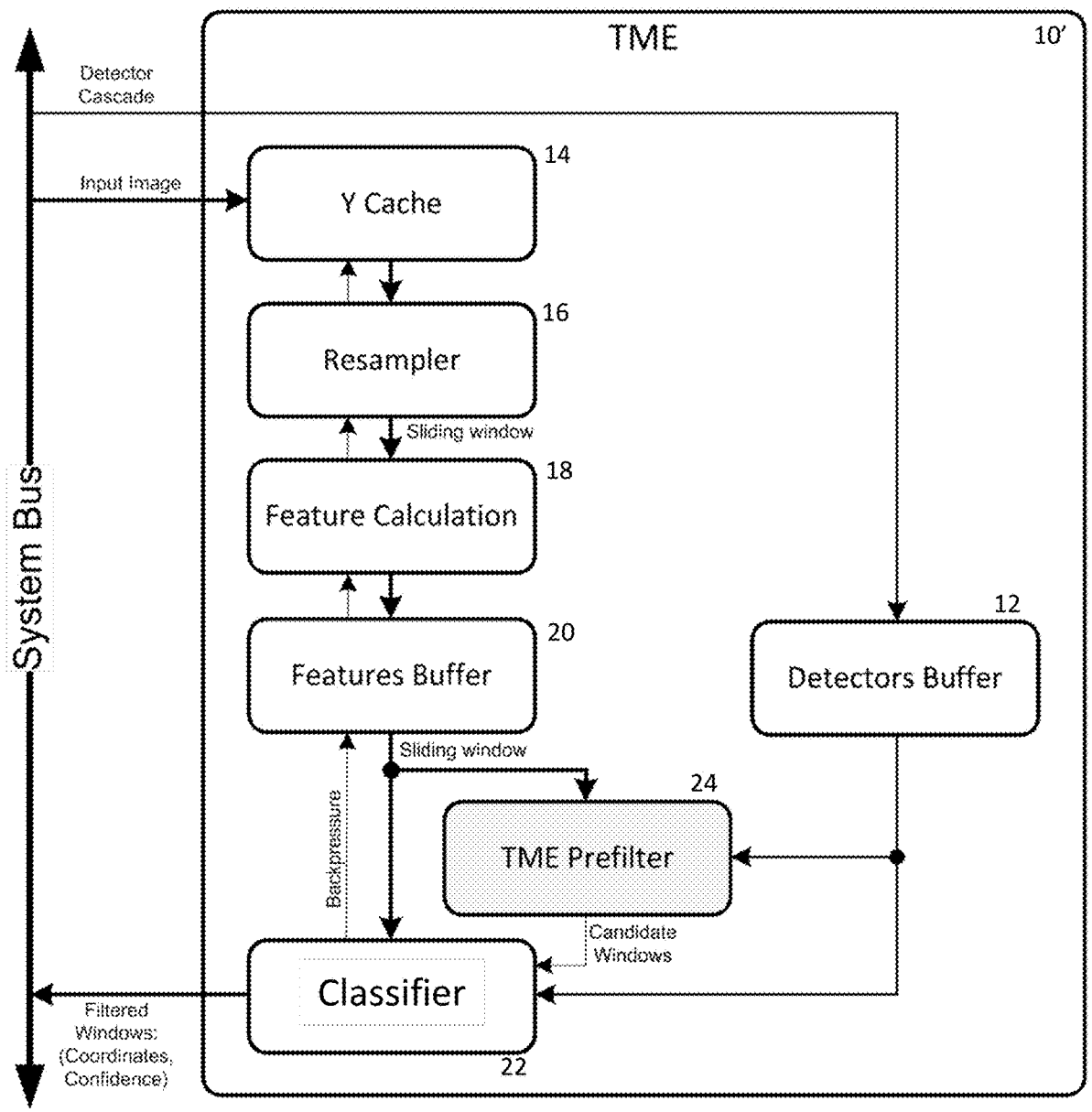
FIG. 2 shows TME module including a Prefilter in accordance with a first embodiment of the present invention.

Referring now to FIG. 2, there is shown a TME 10' including a Prefilter 24 according to a first embodiment of the present invention. The function of the remaining elements of FIG. 2 is basically as explained for the TME of FIG. 1 except where indicated. In general, the processing flow is as follows:

1) The detector buffer 12 receives detector cascade configuration for both the Prefilter 24 and the classifier 22.
2) The feature calculation module 18 receives an image pixel-by-pixel as before.
3) The Prefilter 24 receives its configuration information (node positions, channel information, thresholds) for the classifier stages it is to apply to each window of the image at once. Typically the number of detector stages applied by the Prefilter is between around 10-20 and in the illustrated example is 12 stages.
4) The Prefilter 24 receives all feature maps from the features buffer 20, in raster order.
5) The classifier module 22 also receives the features maps from features buffer 20 as well as an initial decision from Prefilter 24 signaling which candidate windows should be subjected to full classification by the classifier 22.
6) The classifier 22 only applies its detectors to non-rejected windows from the Prefilter 24 and provides its final decision in relation to which windows of an image contain detected objects to other modules via the system bus.

Thus, in the TME 10', the task of the Prefilter 24 is to reject as many windows as possible before they are analyzed by the classifier 22. The Prefilter 24 performs its task on the fly as window information is being read from the system bus, while running the classifier 22 may take many more clock cycles—for example, a full detector cascade applied by the classifier 22 could have up to 4000 stages or more.

In one embodiment of the present invention, each stage of the Prefilter 24 comprises a decision tree of a Random Tree Classifier (RTC). A useful tutorial explaining RTC can be found at http://www.r2d3.us, "A Visual Introduction to Machine Learning".

Figure 3:
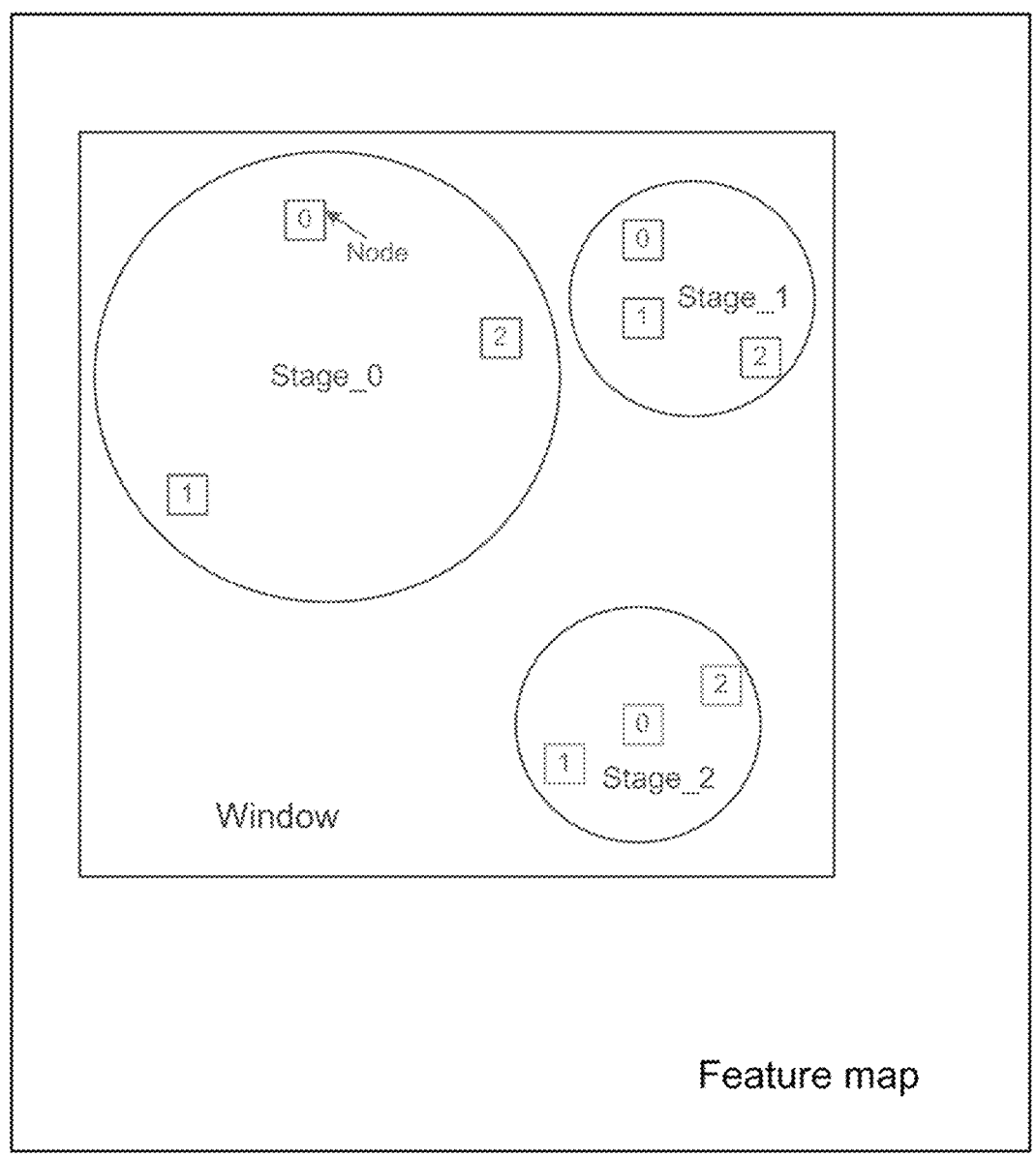
FIG. 3 illustrates a feature map, window, detector nodes and stages employed within embodiments of the present invention.

Referring now to FIG. 3, in such a case, each decision tree comprises 3 nodes, a root node 0 and sub-branch nodes 1 and 2. Each node of a decision tree corresponds to a pixel location within a window to be examined i.e. a relative x,y displacement within a window. In the present example, the values tested at each decision node can come from the corresponding location of a selected feature map.

Figure 4:
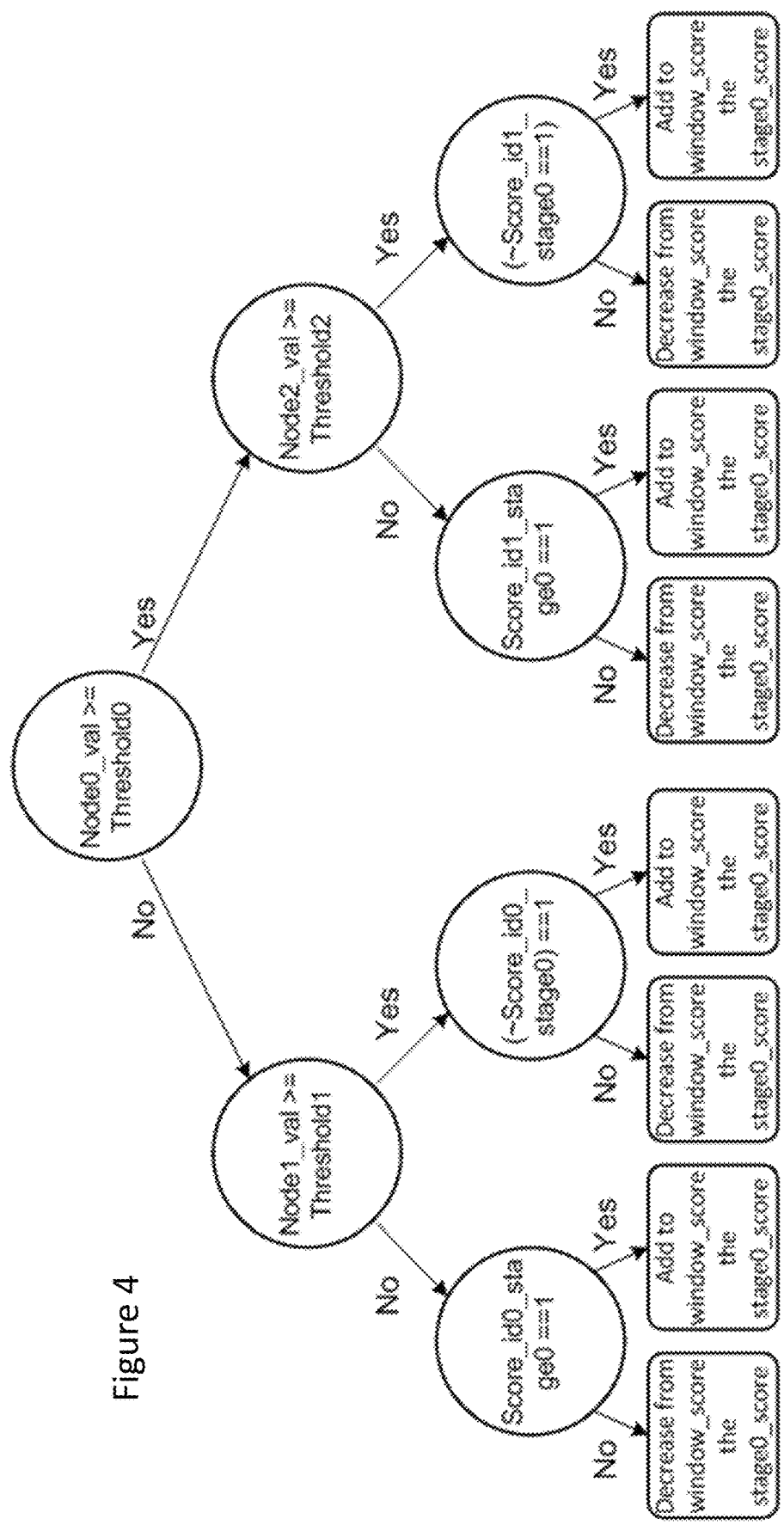
FIG. 4 shows the processing for the first stage of an RTC detector cascade employed within an exemplary Prefilter of FIG. 2.

Referring now to FIG. 4, in a three node decision tree (D3) comprising a stage of a detector cascade, a value for a root node, Node0 is compared with a threshold for that node, Threshold0, to determine which sub-branch of the tree should be taken. At the sub-branch level, the value for either Node1 or Node2, according to the decision taken at Node0, is tested against a respective threshold and depending on the result, a score for the detector cascade is either incremented or decremented by a given amount. The thresholds, feature maps and score for each decision tree are determined through training against a test data set.

Figure 5:
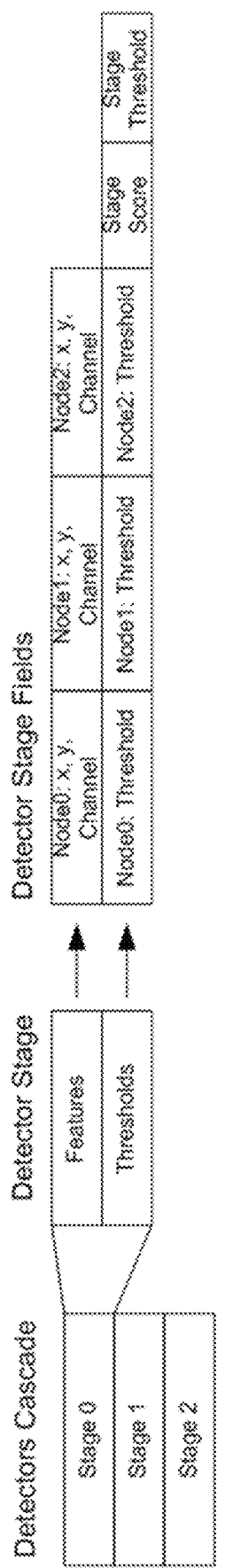
FIG. 5 illustrates the data employed within an RTC detector cascade stage employed within an exemplary Prefilter of FIG. 2.

Referring to FIG. 5, each of the 3 nodes for a stage are associated with a relative x,y location within a window and a specific feature map (channel) as well as a threshold value; and for each stage, there will be a stage threshold and a resulting stage score.

Again, all of these values can be determined through training against a test data set including image windows classified as to be accepted or to be rejected i.e. that they include the kind of features which the classifier 22 is to detect or not.

For a 12 stage D3 detector cascade being applied by the Prefilter 24, 36 nodes will be of interest, each testing a feature map value at a corresponding window location against a threshold to determine either which other node of the decision tree is to be tested or the final score for a stage of detector cascade.

Figure 6:
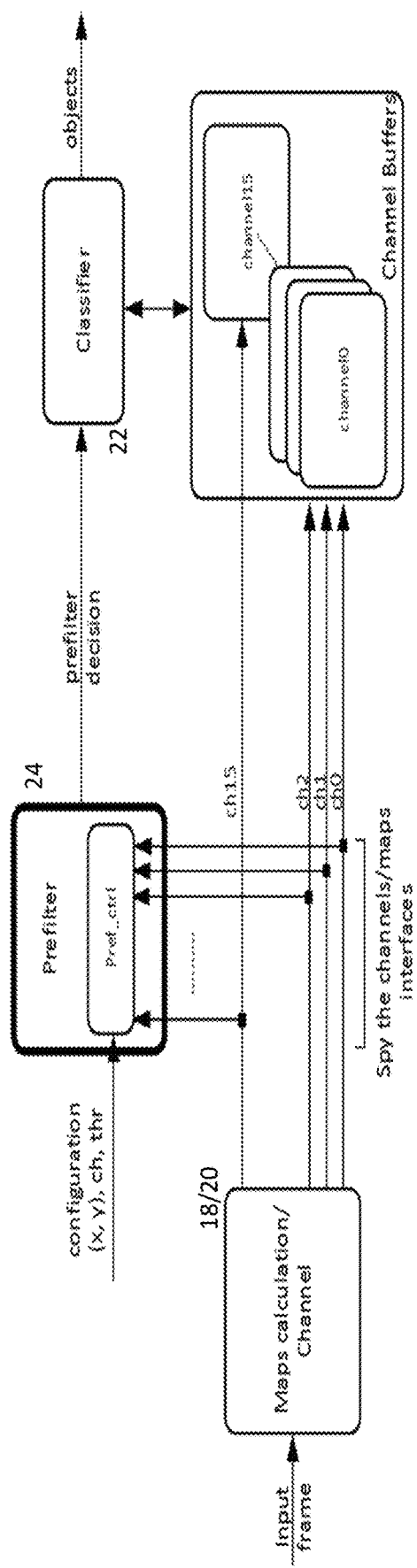
FIG. 6 shows the architecture of the Prefilter of FIG. 2 in more detail.

Referring to FIG. 6, the Prefilter 24 is interposed between the feature calculation/buffer modules 18/20 and the classifier 22 so that as feature maps are generated cycle-by-cycle as the image is being scanned, knowing the x,y locations of the nodes of interest, the Prefilter 24 can read the required values from the relevant feature maps (channels 0 ... 15) to apply the decision trees for each of the stages of the Prefilter 24. Then, according to the accumulated score for the stages applied by the Prefilter 24, the Prefilter 24 can provide its decision to the classifier 22 to indicate whether or not the classifier 22 should apply full detector cascade(s) to the window as soon as the last relevant node location in a window is reached. This means that a decision whether or not to process a window can in fact be made even before the complete window has been read from the system bus i.e. as long as a last read pixel of a window (typically the bottom right corner) is not required as a node within a detector stage, the Prefilter will have made its decision before a complete window is read from memory. Thus, by the time the complete window is read or even beforehand, the classifier 22 can signal, if required, that a window does not contain an object to be detected, or know immediately if it might need or not to apply any further detector cascades to the window.

Figure 7:
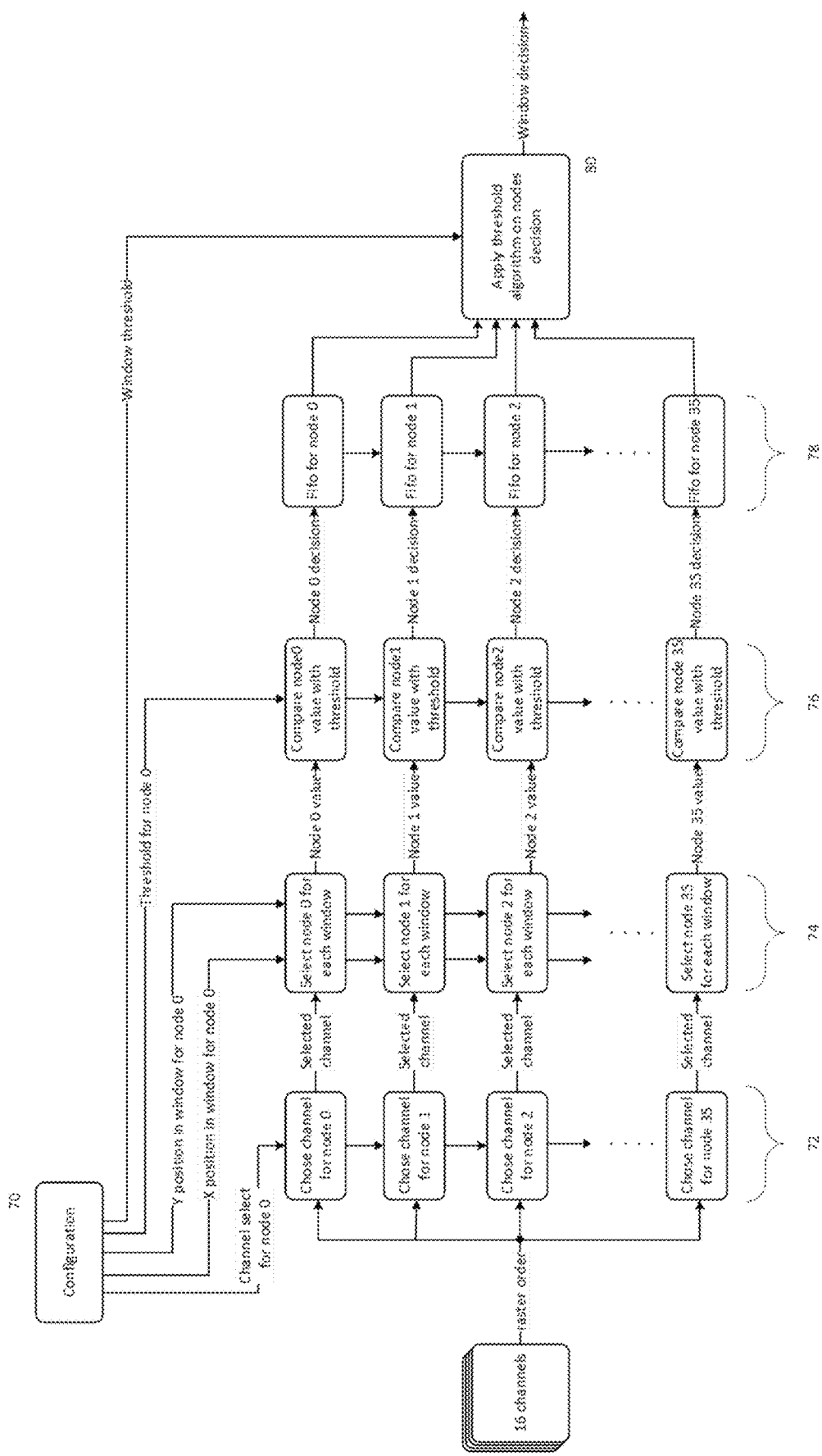
FIG. 7 shows detector stage data being collected within FIFO memories within a Prefilter according to an embodiment of the invention.

Referring now to FIG. 7, which shows an exemplary configuration for the Prefilter 24. Configuration information 70 provided by the detectors buffer 12 prior to image processing is fed to each of a number of selectors 72, 74 and comparators 76—one per node 0 ... 35. Channel information for each of nodes 0 ... 35 is written to selectors 72 and location information for nodes 0 ... 35 is written to selectors 74. Finally, threshold information for each of nodes 0 ... 35 is written to the set of comparators 76. Selectors 72 direct channel information for each image pixel location as it is generated to a corresponding selector 74. When each selector 74 detects that its programmed x,y location within a window has been reached, it provides the selected channel value to a corresponding threshold comparator from the set of comparators 76. When a comparator detects a channel value provided at its input from a selector 74, it performs its comparison and writes its decision to a corresponding FIFO 78. A FIFO is provided for every node that is used in any of the detector stages of the Prefilter detector cascade. In order to be able to calculate a window score, the Prefilter needs all node decisions to be available in FIFO memories for that window. When all FIFO for all nodes have at least 1 location written, the Prefilter pops-out data from all FIFO memories and calculates 1 window score according to a threshold algorithm 80.

So for example, the value for node 0 will determine which of the values from nodes 1 or 2 are to be employed to contribute to the final value for the decision stages applied to the window. The accumulated score from the detector stages can be compared against a configured window threshold to provide a final score value for a window and this can indicate the level of confidence of the Prefilter 24 in relation to whether a given window contains or does not contain an object of interest.

Figure 8:
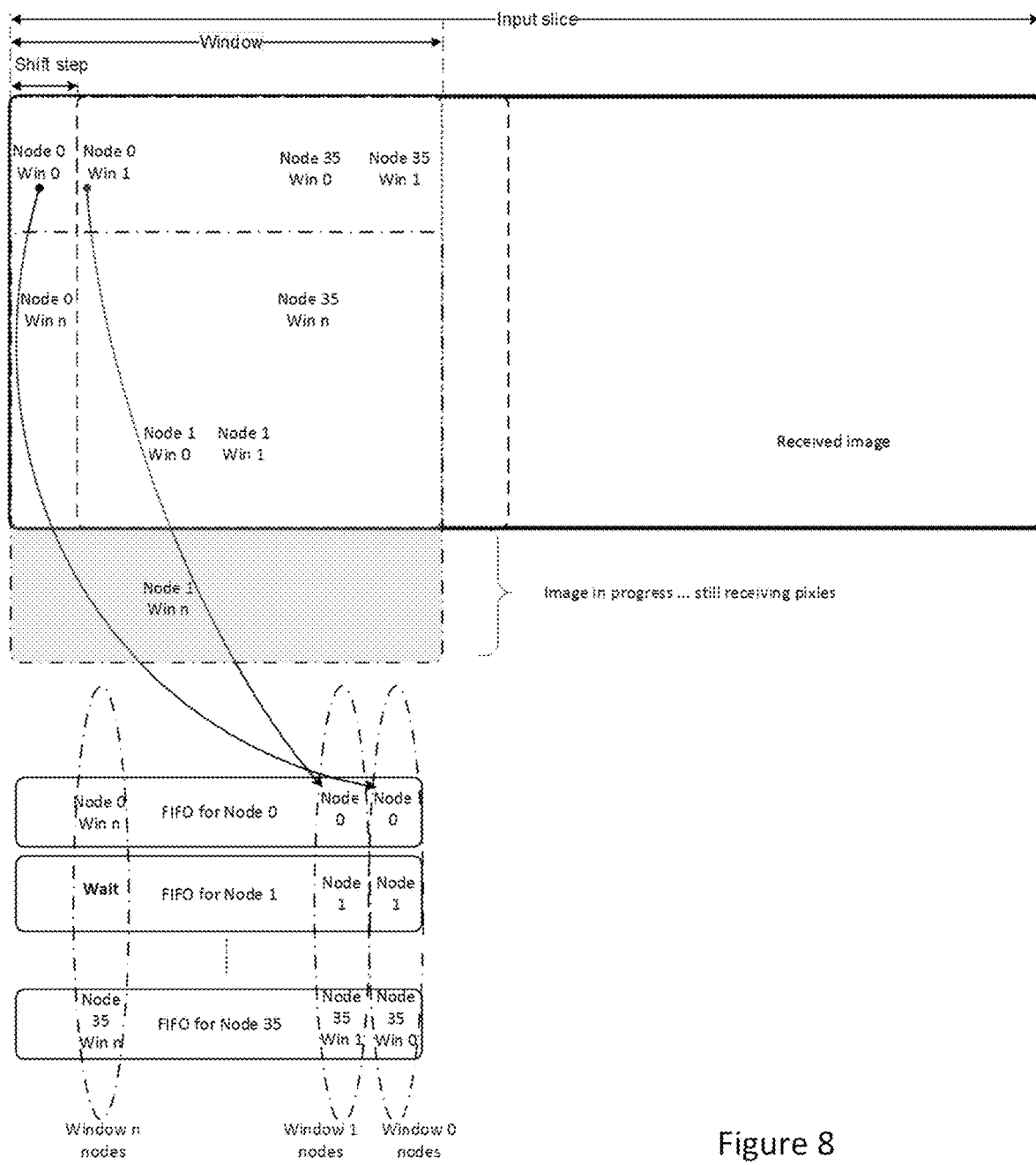
FIG. 8 illustrates pixels from successive windows of a frame being processed.

Referring to FIG. 8, it will be appreciated that as nodes for windows are in the same relative x,y locations within every window, as the TME 10' scans across an image, the FIFOs will fill for successive windows so that decisions can be provided at a rate of 1 per clock cycle.

This characteristic also enables data to be read in bursts of pixels for example 4 or 8 pixels. Thus by multiplying and multiplexing the architecture of FIG. 7 it is possible to perform calculations for more than 1 window per clock cycle and so to eliminate or identify windows as candidates for full classification at an even faster rate.

It will be appreciated that using an RTC classifier cascade allows the Prefilter 24 to not alone provide a yes/no decision in relation to any given window, but also a score indicative of the confidence from a detector that a window either includes or does not include an object to be detected. This can be useful for other applications, performing subsequent image processing on a given image, but the information can also be used with the TME 10' especially if multiple windows are being processed in parallel or if multiple detector cascades are being applied by the classifier 22 as explained in more detail below.

In any case, for any windows which the Prefilter 24 does not reject, the classifier 22 can apply one or more detector cascades. As explained in the above described embodiment, the Prefilter 24 is based on number of RTC stages. Each of the channel values generated as a pixel is read from the system bus are made available to each of the selectors 72 and so each of these can be freely programmed based on the training data set to choose from whichever channel enables the Prefilter 24 to best discriminate between windows which should be rejected before full classification and those which should be subjected to full classification.

In some embodiments, the classifier 22 can also be based on such RTC stages. However, within the classifier 22 each stage is applied in sequence, building a score for a window. At each stage of the detector a stage score is added or subtracted to/from the window score, depending on the stage evaluation result. A window score after each stage is compared with a threshold for a stage. While the window score is above the stage threshold, the next detector stage is applied, whereas if the window score is below the stage threshold the detector is abandoned. If the last stage of the detector cascade is reached, the window score is compared with the global threshold of the detector cascade and if the window score is above the global threshold, a match is signaled.

Each stage of the classifier is based on channel values corresponding to three nodes within a window. If no assumptions were made about which channels each node of a decision tree for a stage were to be associated with, then at least 2 successive reads from the same channel might be required before a decision could be taken for a stage (assuming that one 1 sub-branch decision for either node 1 or 2 needs to be taken). However, in order to speed up decision making within the classifier 22, in embodiments of the classifier 22 based on RTC decision trees, each stage is restricted to nodes based on different channels. So for example, Node0 for a stage might be based on a HOG value for at a pixel location; Node1 for a stage might be based on an intensity value for a pixel; and Node 2 for a stage might be based on an II value for a pixel. This means that the separate feature memories (channels) for each node can be read in the same clock cycle and compared against their threshold values, as required, and the final score for a stage generated in the minimum of clock cycles—potentially speeding up the performance of the classifier 22 twofold.

It will also be seen that there are applications where the TME might be required to apply a number of different detectors to any given window. Take for example, a biometric recognition application running on the same device as the TME 10' where the application might be required to attempt to recognize a user in one of a number of different poses, for example, front, tilted, left or right side profile.

In such a case, the detectors buffer 12 could be provided with a plurality of detector cascades, each for a different detector.

Even if a Prefilter 24 trained to reject windows for which no such detector cascades would be successful were employed i.e. a common rejector, the classifier 22 might still be required to run a number of full length detector cascades on every window passed by the Prefilter 24.

Figure 9:
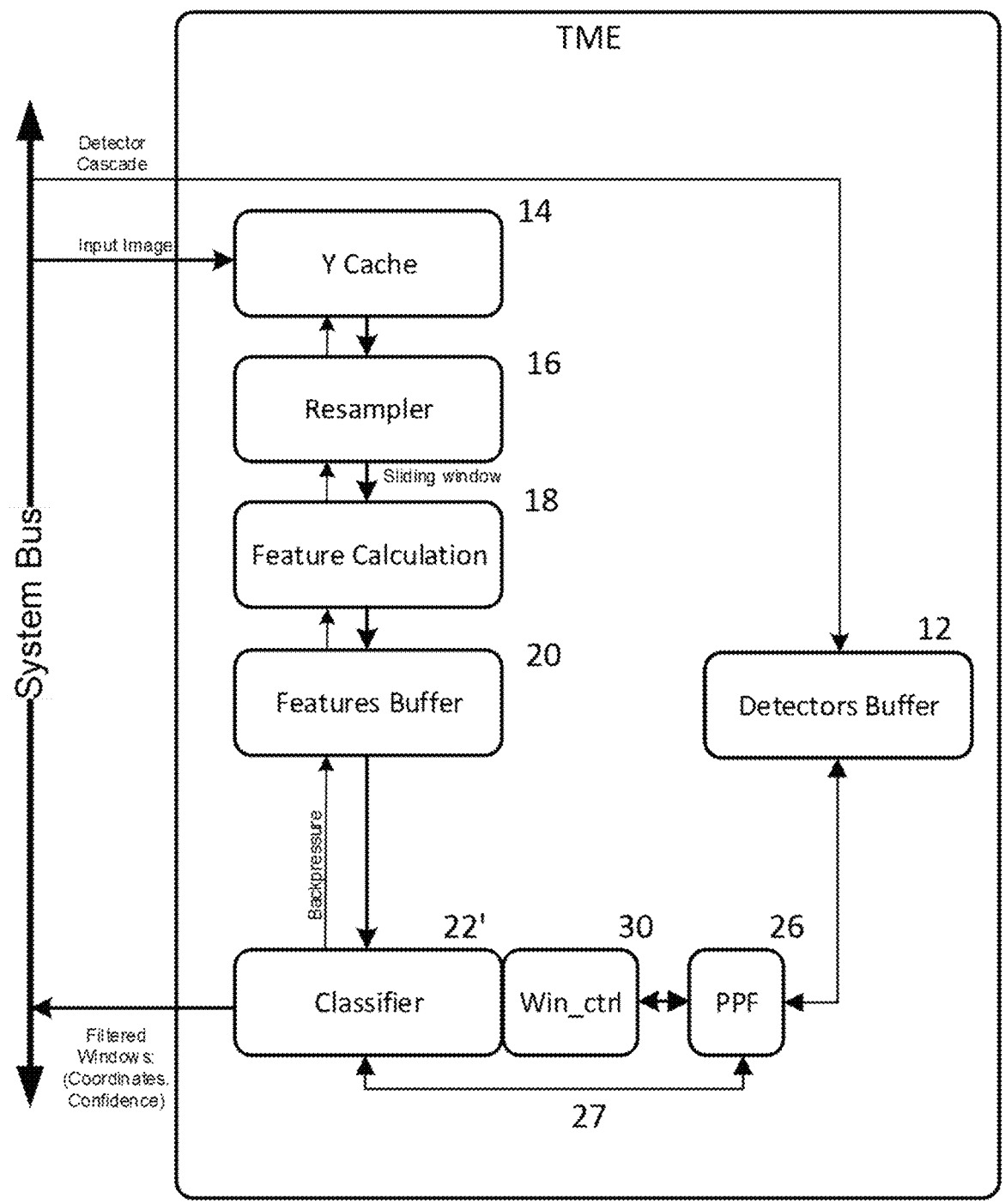
FIG. 9 illustrates a template matching engine including a programmable classifier according to a second embodiment of the present invention.

Referring now to FIG. 9, in a further variant of TME 10″, a programmable prefilter (PPF) 26 is provided in order to control the detectors applied by a modified classifier 22′. Again elements of FIG. 9 having the same reference numerals as in FIGS. 1 and 2 perform substantially the same function.

The PPF 26 is provided with a rules engine (not shown) which enables the PPF to determine which detector cascades from detectors buffer 12 will be applied or which detectors will be applied in full to any given window. The rules engine is either pre-programmed according to application requirements i.e. hardcoded, or the rules engine can be configured by an application (for example, the biometric recognition application referred to above) by providing the required configuration information across the system bus.

In a first example, the detectors buffer stores 4 full detector cascades. The PPF can apply a first limited number of stages from each cascade, say 12, to a current window. It does this by providing the detector configuration to the classifier 22′ via a bus 27 in a similar fashion to the manner in which the classifier 22 of FIGS. 1 and 2 is provided with a detector cascade from the detectors buffer 12.

The PPF however is also able to communicate with the classifier 22′ via a window control interface (Win_Ctrl) 30. This interface 30 provides the PPF 26 with a score once each detector cascade is complete. Using the scores from each limited stage detector cascade, the PPF can now decide which further detector cascade might be applied to the current window. This could mean that rather than applying 4 full detector cascades to every window not rejected by a Prefilter 24 (where provided), the classifier might only need to apply 1 full detector cascade following a number of limited stage cascades. It will also be seen that the rules engine could also control whether all of the limited stage detector cascades are indeed applied to a given window—so for example, if a first limited stage detector cascade returned a very high score for a window, the PPF 26 might decide to proceed directly to applying the corresponding full length detector cascade on that window.

The PPF approach becomes even more useful when applied in conjunction with a classifier 22′ based on RTC stages. Again, using the fact that nodes for each RTC stage have the same relative displacement within windows, means that image pixel information can be read in bursts of say 4 or 8 pixels—similar to the manner described above for the Prefilter 24. Indeed if a Prefilter 24 were being employed with the PPF 26 and classifier 22′, it would be beneficial if each employed the same burst read size.

Using a burst read, means that detector stages for the classifier 22′ can be applied for a plurality of successive windows in parallel. In this case, the Win_Ctrl interface 30 enables to PPF to obtain scores from multiple windows in a single clock cycle.

Now, by running a first limited stage detector across a number of windows in parallel, followed by second and subsequent limited stage detectors across the same windows, the results can be used by the PPF to determine to which if any of those parallel windows a full detector cascade should be applied.

So for example, if from a set of windows 0 . . . 7 being processed in parallel, windows 1 and 5 returned positive scores for a first limited stage detector, while window 3 returned a very positive score for a second limited stage detector, the PPF 26 could then decide to indicate to the classifier 22′ via the Win_Ctrl interface that it should only apply a full stage detector corresponding to the second limited stage detector to the windows.

Note that in this case, it makes little difference whether the full stage detector is applied to all of windows 0 . . . 7 or just to one of windows 0 . . . 7 as the classifier 22′ will not be able to advance to the sequence of windows following windows 0 . . . 7 until the full stage detector has completed processing any of windows 0 . . . 7. Thus, the information garnered from applying the full stage detector to all of the windows can be used by the PPF to determine the processing to be applied to subsequent windows.

Regardless, the approach of applying a number of limited stage detectors before using their results to determine which of any of a number of full stage detectors is to be applied to a window provides a significant reduction in the time required to check an image for the presence of a number of different types of object—or an object such as a face having a number of potential different appearances.

Note that while the above embodiments have been described in terms of processing an image, it will be appreciated that the TME of the embodiments may only be concerned with processing a portion of an image. For example, an application running within the system may determine that only a region of interest (ROI) from a complete image might need to be scanned for the presence of objects and so only this portion might be supplied to the TME 10′, 10″ or else the TME might be signaled to only apply the classifier 22,22′ to a subset of received image data. For example, for biometric recognition based on iris patterns, only areas of an image surrounded by skin portions might be examined by the classifier 22, 22′.

Alternatively, an image might be provided to the TME in stripes to limit the amount of memory required by the TME 10′, 10″.

The invention claimed is:

1. A method comprising:
reading, by an image processing system, a portion of an image window, the read portion comprising a plurality of pixels of the image window;
determining, by the image processing system, a first node within a first object detection model, wherein the first node is associated with a first pixel location within the image window and a first feature value threshold;
determining, by the image processing system, a second node within the first object detection model, wherein the second node is associated with a second pixel location within the image window and a second feature value threshold;
in response to determining that the plurality of pixels within the read portion of the image window include the first pixel location and the second pixel location, determining a score for the image window based at least in part on a first comparison between a first feature value calculated for the first pixel location and the first feature value threshold, and a second feature value calculated for the second pixel location and the second feature value threshold;
comparing, by the image processing system, the score for the image window to a window threshold; and
determining, by the image processing system, whether to apply a second object detection model longer than the first object detection model, to the image window, based on the comparison of the score for the image window to the window threshold.

2. The method of claim 1, wherein the determination of whether to apply the second object detection model to the image window is performed before the image window is completely read by the image processing system.

3. The method of claim 1, further comprising:
sub-sampling the portion of the image window, wherein the portion of the image window is sub-sampled before the calculation of the first feature value and the second feature value.

4. The method of claim 1, wherein the first object detection model comprises a multi-stage random tree classifier, wherein each stage of the multi-stage random tree classifier includes at least one node.

5. The method of claim 1, further comprising:
determining whether to apply the second object detection model to a second image window, wherein the second image window overlaps with the image window.

6. The method of claim 5, wherein the first object detection model is applied to the image window and the second image window during a same clock cycle.

7. The method of claim 6, further comprising:
determining a second score for the second image window; and
comparing the second score for the second image window to the window threshold;
applying the second object detection model to the image window, in response to a determination that the score for the image window is lower than the window threshold; and
applying the second object detection model to the second image window, in response to a determination that the second score for the second image window is lower than the window threshold.

8. The method of claim 7, wherein the second object detection model is applied successively to the image window and the second image window.

9. An image processing system comprising:
a processing unit comprising one or more processors; and
a memory storing processor-executable instructions that, when executed by the one or more processors, perform operations comprising:
reading a portion of an image window, the read portion comprising a plurality of pixels of the image window;
determining a first node within a first object detection model, wherein the first node is associated with a first pixel location within the image window and a first feature value threshold;
determining a second node within the first object detection model, wherein the second node is associated with a second pixel location within the image window and a second feature value threshold;
in response to determining that the plurality of pixels within the read portion of the image window include the first pixel location and the second pixel location, determining a score for the image window based at least in part on a first comparison between a first feature value calculated for the first pixel location and the first feature value threshold, and a second feature value calculated for the second pixel location and the second feature value threshold;
comparing the score for the image window to a window threshold; and
determining whether to apply a second object detection model longer than the first object detection model, to the image window.

10. The image processing system of claim 9, wherein the determination of whether to apply the second object detection model to the image window is performed before the image window is completely read by the image processing system.

11. The image processing system of claim 9, the operations further comprising:
sub-sampling the portion of the image window, wherein the portion of the image window is sub-sampled before the calculation of the first feature value and the second feature value.

12. The image processing system of claim 9, wherein the first object detection model comprises a multi-stage random tree classifier, wherein each stage of the multi-stage random tree classifier includes at least one node.

13. The image processing system of claim 9, the operations further comprising:
determining whether to apply the second object detection model to a second image window, wherein the second image window overlaps with the image window.

14. A method comprising:
reading, by an image processing system, at least a portion of an image window;
calculating, by the image processing system, a first feature values for a first feature map associated with a first image channel, based on the read portion of the image window;
calculating, by the image processing system, a second feature value for a second feature map associated with a second image channel, based on the read portion of the image window;
determining, by the image processing system, an object detection model to apply to the image window, wherein the object detection model includes at least a first stage having at least a first node and a second node, wherein the first node is associated with the first feature value in the first feature map, and the second node is associated with the second feature value in the second feature map;
applying, by the image processing system, the object detection model to the image window, where said applying comprises:
a first comparison between the first feature value in the first feature map, and a first threshold value of the first node; and
a second comparison between the second feature value in the second feature map, and a second threshold value of the second node; and
determining, by the image processing system, a score for the image window based at least on the first comparison and the second comparison.

15. The method of claim 14, wherein the first feature map comprises at least one of an Intensity Image, an Integral Image (II), an $II^2$ map, a Census map, a Linear Binary Pattern (LBP) map, or a histogram of gradients (HOG) map, and wherein the second feature map comprises a different one of an Intensity Image, an Integral Image (II), an $II^2$ map, a Census map, a Linear Binary Pattern (LBP) map, or a histogram of gradients (HOG) map.

16. The method of claim 14, wherein applying the object detection model to the image window comprises performing the first comparison and the second comparison during a same clock cycle.

17. The method of claim 14, wherein the object detection model is a multi-stage limited detector cascade, wherein each stage of the limited detector cascade includes one or more nodes.

18. The method of claim 17, further comprising:
determining, based on the comparison of the score for the image window to a window threshold, whether to apply a second detector cascade, longer than the limited detector cascade, to the image window.

19. The method of claim 17, applying the limited detector cascade to the image window comprises performing each stage of the limited detector cascade during a same clock cycle.

20. The method of claim 14, wherein the score for the image window is determined before the image window is completely read by the image processing system.

* * * * *